No. 715,138. Patented Dec. 2, 1902.
G. L. PIERCE.
SPIKED SOLE FOR BOOTS OR SHOES.
Application filed Apr. 19, 1902.
(No Model.)
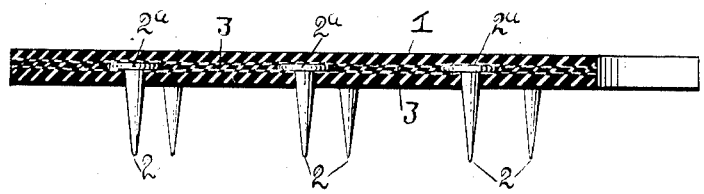
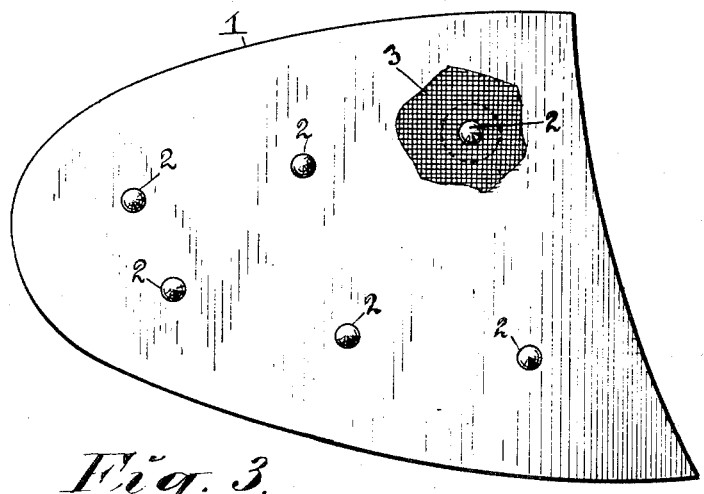
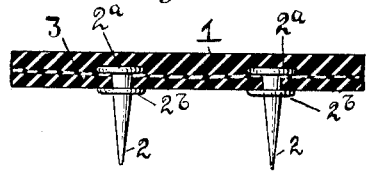
WITNESSES:
INVENTOR
George L. Pierce
BY
ATTORNEY

UNITED STATES PATENT OFFICE.

GEORGE L. PIERCE, OF BROOKLYN, N. Y.

SPIKED SOLE FOR BOOTS OR SHOES.

SPECIFICATION forming part of Letters Patent No. 715,138, dated December 2, 1902.

Application filed April 19, 1902. Serial No. 103,672. (No model.)

*To all whom it may concern:*

Be it known that I, GEORGE L. PIERCE, a citizen of the United States, residing in the borough of Brooklyn, in the county of Kings and city and State of New York, have invented certain Improvements in Spiked Soles for Boots or Shoes, of which the following is a specification.

This invention relates to the class of anti-slipping devices for the soles of shoes used by athletes in games, races, and the like; and the object is to provide a rubber sole having spikes with their heads embedded in the mass of the rubber, each spike being independent of the others, so that they may yield or sway somewhat laterally under certain strains and right themselves when the strain is removed. To strengthen the structure and prevent the spikes from pulling out or driving in, the embedded heads thereof will be by preference embraced between layers of woven fabric which is embedded in and substantially incorporated with the rubber of the sole.

In the accompanying drawings, which illustrate an embodiment of the invention, Figure 1 is a section of the sole, taken through a row of the spikes; and Fig. 2 is an under side view of the sole. Fig. 3 is a sectional view showing the spikes provided with shields.

In the drawings, 1 designates the rubber sole, and 2 the spikes. These latter have their heads $2^a$ embedded in the mass of the rubber and by preference occupying a position about midway of the thickness of the sole. Preferably, also, the heads of the spikes will be embraced between two plies or sheets 3 of some woven fabric, such as canvas, for example.

In Fig. 2 the rubber is broken away about one of the spikes to show the ply of fabric.

It will be understood that in the manufacture of the spiked sole the spikes and plies of canvas are placed in the plastic mass of rubber before vulcanizing the latter, whereby after vulcanizing the whole will form one incorporated mass.

Each spike is set in the rubber separately and independently of the others, so that they may bend over laterally under certain heavy strains—as in running, for example—and right themselves without injury to either the spikes or the sole. This is an important feature in this class of structures, and especially those for outdoor use, where the spikes are long. The sole illustrated is designed for outdoor exercises. Where the sole is to be used indoors for gymnasium exercises and the like, the spikes may be shorter.

Fig. 3 illustrates a spike having a shield $2^b$ on its shank so disposed as to rest or bear on the lower face of the sole. This shield practically doubles the surface of the head without in any way interfering with the ability of the spike to bend over or sway laterally and right itself. With an excessively broad head the spikes would lose this quality and be held too rigidly in position.

In Fig. 3 only one ply of canvas or fabric is shown.

I wish it understood that I do not claim a structure where a plurality of pins or spikes are rigidly fixed to a metal plate and said plate is embedded in rubber or the like, as this structure does not permit of any lateral sway of the spikes, nor do I claim a structure where the heads of the spikes are embraced between the leather sole of the shoe and the outer sole of rubber or the like. This structure does not allow play of the individual spikes, which I deem essential to my purpose.

By the phrase "wholly embedded" as herein employed with reference to the position of the heads of the spikes in the rubber is meant the embedding of the said heads in such a manner that they are backed or entirely covered by the rubber, so that in the pressure on the spikes in actual use the heads are cushioned by the rubber behind them and between the heads and the sole of the shoe.

The spikes 2 are herein shown as tapered to a point; but this is not essential to my invention. Obviously the exposed part of the spike may have any approved form. By the word "spike" as herein employed I mean any form of pin or stud commonly used for such purposes.

Having thus described my invention, I claim—

1. A spiked sole for the purposes specified, comprising a rubber sole having spikes projecting from its lower face, said spikes being set independently of each other and each having its head embedded wholly within and backed by the mass of rubber of the sole, substantially as and for the purpose set forth.

2. A spiked sole for the purposes specified, comprising a rubber sole having spikes projecting from its lower face, said spikes being set independently in the rubber and each having its head embedded wholly within and backed by the mass of the latter, and said rubber having incorporated in its mass a sheet or ply of woven fabric which is pierced by the spikes, substantially as and for the purpose set forth.

3. A spiked sole for the purpose specified, comprising a rubber sole having spikes projecting from its under or lower face, said spikes being set independently of each other and each having its head embedded in and backed by the mass of rubber forming the sole, and each having also a shield which bears on the lower face of the sole, substantially as and for the purposes set forth.

In witness whereof I have hereunto signed my name, this 15th day of April, 1902, in the presence of two subscribing witnesses.

GEORGE L. PIERCE.

Witnesses:
HENRY CONNETT,
H. G. CONNETT.